United States Patent [19]

Polancic

[11] Patent Number: 4,913,917
[45] Date of Patent: Apr. 3, 1990

[54] FORMED MEAT PRODUCT AND PROCESS OF PREPARING

[76] Inventor: James Polancic, 728 W. Lafayette St., Ottawa, Ill. 61350

[21] Appl. No.: 411,680

[22] Filed: Sep. 25, 1989

Related U.S. Application Data

[63] Continuation-in-part of Ser. No. 271,631, Nov. 16, 1988, abandoned.

[51] Int. Cl.$^4$ .......................... A23L 1/314; A23P 1/08
[52] U.S. Cl. ........................................ 426/92; 426/96; 426/274; 426/293; 426/295; 426/297; 426/513; 426/641
[58] Field of Search .................. 426/92, 96, 104, 293, 426/295, 297, 302, 641, 513, 274

[56] References Cited

U.S. PATENT DOCUMENTS

| | | | |
|---|---|---|---|
| 3,208,856 | 9/1965 | Luker | 426/295 |
| 3,236,656 | 2/1966 | Wittig | 426/513 X |
| 3,370,960 | 2/1968 | Jaccard | 426/513 X |
| 3,666,489 | 5/1972 | Lovell | 426/297 |
| 3,904,772 | 9/1975 | Moegle | 426/297 X |
| 4,258,068 | 3/1981 | Huffman | 426/513 X |
| 4,518,620 | 5/1985 | Monagle et al. | 426/293 X |

Primary Examiner—Arthur L. Corbin
Attorney, Agent, or Firm—Douglas B. White

[57] ABSTRACT

There is provided a process (and resulting product) which includes tenderizing and flattening of a cut of meat, coating the product with a wash of milk and egg protein and then a fine cracker meal (including wheat gluten) to produce a coating having adhesive qualities, modifying the shape of the product by overlapping edges, applying deforming pressure to the product to form a unified structure and causing adherence of the edges, and finally recoating the product to produce a uniform meat product with a breaded appearance. In commercial production this final product is then frozen and packaged for distribution.

20 Claims, 2 Drawing Sheets

FORMED MEAT PRODUCT AND PROCESS OF PREPARING

This is a continuation in part of U.S. patent application Ser. No. 271,631, filed Nov. 16, 1988, now abandoned.

BACKGROUND OF THE INVENTION

1. Field of the Invention

The present invention relates to methods of forming meat products and also to the resulting product. More particularly the invention relates to methods for producing a product of a predefined shape without grinding, chopping or generally restructuring an initial cut of meat.

2. Description of the Prior Art

The need for portioned cuts of meat, and particularly pork, that are uniform in size, shape, weight, and density and have the desired sensory attributes (texture, tenderness, juiciness, and flavor) has long existed and has been well documented (see U.S. Pat. No. 4,258,068). Moreover, this requirement has increased through the years with the increasing size of the meat industry, largely as a result of demands by the hotel, restaurant, and institutional industries for uniform size and quality. These requirements are now carrying over strongly into the retail markets.

In an attempt to satisfy the demand the processing industry has answered with numerous methods for chopping, flaking or grinding the meat and then restructuring the finished product to represent an acceptable meat product. Flake cutting of meat with subsequent reforming has resembled ground meat (hamburger) products and does not pass as a steak or chop. This result is even true with ground meat and sausage products, and the consumer acceptance of these has declined with increased suspicion about the contents.

In obtaining the final product it has been a general objective in the industry to avoid chemical processing, chemical tenderizing, and expensive aging. One of such processes reduces a cut of meat to small chunks and uses a mechanical tenderizer to reduce proteins from within the meat. It is then mixed and massaged into a log where it solidifies. This technique employs "the rigormortis principle" and therefore lacks general appeal to the knowledgeable consumer. Additionally, as with ground meat and sausage products, consumers are generally concerned over the presence of foreign material in the composition.

What has therefore developed as a result of the consumer demand is a need for a non-sausage and non-ground meat like product which is of uniform quality and of acceptable sensory attributes.

SUMMARY OF THE INVENTION

It is accordingly a principal object of the present invention to provide a finished meat product formed from a single cut of meat which exhibits uniformity among the products yet preserves the attributes of the original cut of meat.

It is a further object to provide a manufacturing process and product which is adaptable to also form the product from irregular pieces.

It is finally an object to produce a product which, when formed, has consistent and acceptable characteristics throughout.

Generally there is provided a process (and product resulting therefrom) comprising the cutting and trimming of a cut of meat, tenderizing and flattening of the cut, coating the product with a mixture having adhesive qualities, modifying the shape of the product by overlapping edges, applying deforming pressure to the product to form a unified reformed structure, and finally recoating the product to produce a uniform meat product. In commercial production this final product is then frozen and packaged for distribution.

While the invention will be described in connection with a preferred embodiment, it will be understood that I do not intend to limit the invention to that embodiment. On the contrary, I intend to cover all alternatives, modifications, and equivalents as may be included within the spirit and scope of the invention as defined by the appended claims.

DESCRIPTION OF THE PREFERRED EMBODIMENT

Figure 10:
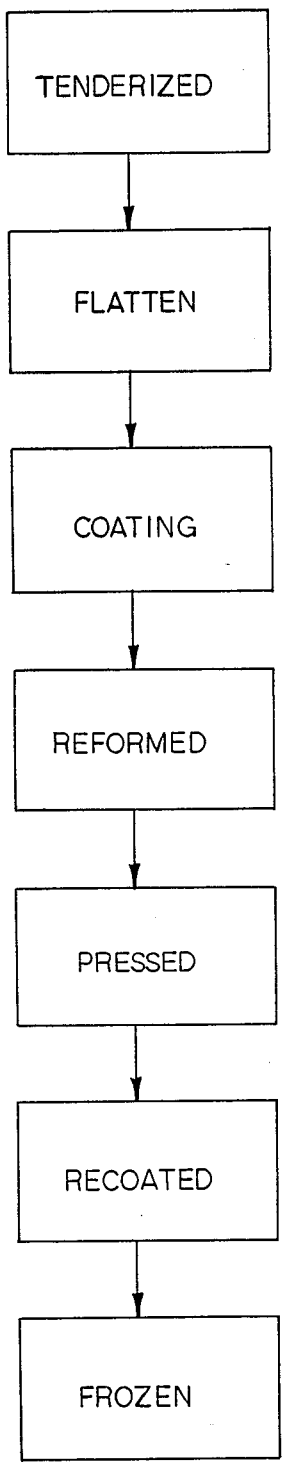
FIG. 10 is a block flow diagram of the process of the present invention.

Turning first to the series of FIGS. 1-9, the basic process of the invention is shown. This process is depicted in the flow diagram of FIG. 10 in an abbreviated form. Basically the steps require that a specific cut of meat be first tenderized, then flattened, coated, reshaped, pressed to adhere adjoining edges, recoated, and finally packaged and frozen.

The processing begins with a slice or cut of meat 10, such as a slice of pork loin. Typically the thickness of this slice would be in the range of $\frac{1}{2}$ inch to $\frac{3}{4}$ inch. This slice is trimmed of noticeable fat and then tenderized (FIG. 2) by the placing of numerous transversely positioned cuts or breaks within the slice. This tenderizing may be accomplished by many ways known to the art, but in the preferred process a commercially available machine is used to create the small transverse cuts and thereby break the fibers and strands in the slice of meat to create a uniformity of shortened fibers throughout the product.

After this tenderization step, the meat product is then flattened (FIG. 3) to a thickness of about $\frac{1}{4}$ to $\frac{3}{8}$ of an inch. At this stage a product has been created which is both relatively thin yet comprises short but unseparated meat fibers. However, further processing is required to produce the desired product which is of uniform size and shape, and which presents an attractive finished product for the consumer.

In order to achieve the final product the prepared slice of meat is next covered with a coating having adhesive properties. Such a coating necessarily must not only adhere to the product during processing and cooking, but must also exhibit adhesion in the process of joining of edges for reforming of the product. In the preferred embodiment this coating blends un-noticeably within the product to create an apparent uniform single slice of meat. Another constraint on the coating is that is must represent "natural" ingredients to the greatest extent possible. As a result of experimentation it was discovered that proper adhesion could be obtained by using a combination of the adhesion properties of milk and egg protein and gluten. This is accomplished by the immersion or washing of the meat product with a bath containing the milk and egg protein. Best results were obtained by combining the egg with a low fat milk product, known commonly as 2%, in a ratio of about one dozen eggs to 5 gallons of the milk. A mixture with a higher milk fat content was found to interfere with the adhesion properties. This liquid bath is applied to cover all surfaces between fibers and permeate the product surface and prepare it to accept the gluten mixture.

Following the bath the product is covered on all surfaces with a gluten containing mixture. Particularly, success has been achieved with a product known commercially as fine cracker meal. This is generally disposed across the top 12 and bottom 14 surfaces and then pressed into the surfaces under 2-3 lbs., of pressure applied via a roller mechanism. This coating should be between ⅛-174 inch thick in order to successfully accomplished the reforming.

Figure 1:
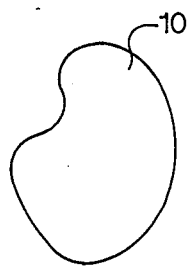
FIG. 1 is a plan view of a cut of meat, such as a pork loin, from which noticeable fat has been trimmed.
Figure 2:
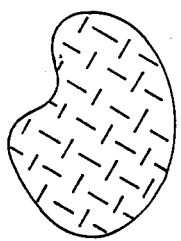
FIG. 2 is a plan view of the cut of meat of FIG. 1 following processing of the cut of meat through a commercial tenderizer.
Figure 3:
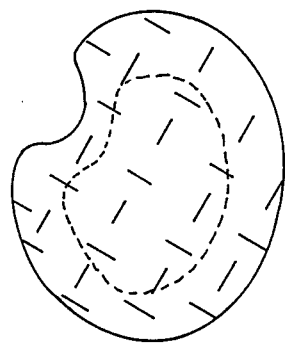
FIG. 3 is a plan view of the cut of meat of FIG. 2 following flattening of the tenderized cut.
Figure 4:
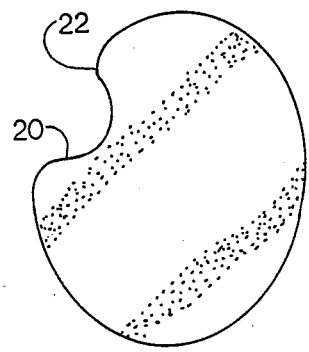
FIG. 4 represents a plan view of the cut of meat of FIG. 3 following the coating of the cut with a "breaded" type coating having adhesive properties.
Figure 5:
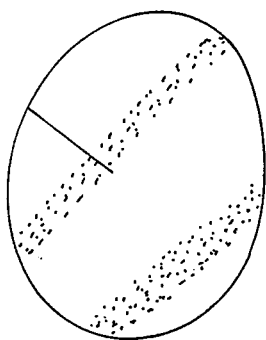
FIG. 5 depicts a plan view of the coated product of FIG. 4 wherein edges along an irregularity have been overlapped to reform the product.
Figure 6:
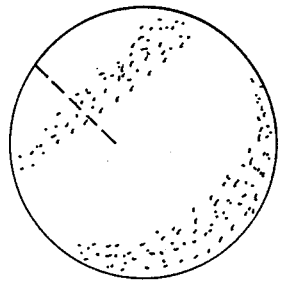
FIG. 6 represents the reformed product of FIG. 3 where the product has been pressed to deform and adhere the overlapped portions.
Figure 7:
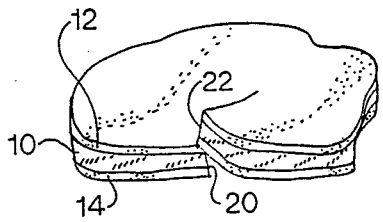
FIG. 7 is a perspective view of the product of FIG. 5 showing the overlapped edges.
Figure 8:
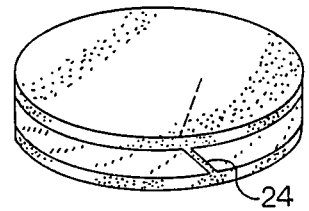
FIG. 8 is a perspective view of the product of 6 showing the overlapped edges after being pressed to adhere the edges.
Figure 9:
FIG. 9 represents a cross sectional view of the product of FIG. 8 after a second final coating.

Having received this coating, imperfections causing an irregular shape may now be corrected. Turning to FIG. 5, the adjoining edges 20 and 22 of the irregularity of FIG. 4 are brought together and slightly overlapped, as shown in FIG. 7. This positions a thin layer 24 of adhesive coating between adjoining the edges. Following this alignment the overlapped edges are pressed to cause deformation and adhesion and thereby form the slice into a more uniform shaped product as shown in FIGS. 6 and 8. The resulting adhesion is quite strong and the coating becomes un-noticeable between joined edges; a product results which appears to be a single slice of meat. At this stage peripheral irregularities may be also trimmed to further correct its shape.

Final coating is provided, in the preferred embodiment of this process, by processing the product once again through the egg/milk bath, then through the cracker meal covering and then under the pressure roller. This coating 26 improves the overall appearance and presents the product as a breaded cut of meat. As a result, the finished product as represents in cross section in FIG. 9 has achieved an attractive uniform breaded surface appearance and ranges from ⅜ to ⅝ of an inch in thickness. Additionally, the product is now of a uniform short fiber consistency and is now an acceptable commercial product. For distribution this product is then packaged and frozen.

From the foregoing description, it will be apparent that modifications can be made to the apparatus and method for using same without departing from the teaching of the present invention. Accordingly the scope of the invention is only to be limited as necessitated by the accompanying claims.

I claim:
1. A meat product comprising:
   a slice of meat;
   a coating on said slice of meat, wherein said coating comprises a wash including milk and egg protein and further comprises a covering including wheat gluten; and
   joined portions defined on said slice wherein edges of the coated meat slice are joined under adhesion of said coating and under pressure sufficient to deform said meat to form the product into a flattened shape of substantially uniform thickness which presents the appearance of a single coated slice of meat wherein the transition between joined edges becomes substantially un-noticeable.
2. The formed meat product of claim 1 wherein said slice of meat is comprised of a prepared slice of meat having a plurality of deep transverse cuts across the surface thereof to shorten fibers therein and tenderize the product.
3. The formed meat product of claim 2 wherein said slice of meat is comprised of a prepared slice of meat wherein said slice is pressed to reduce its thickness and expand its circumference.
4. The formed meat product of claim 3 wherein said coating is pressed into the surface of said slice of meat.
5. The formed meat product of claim 1 wherein said slice of meat is comprised of a prepared slice of meat wherein said slice is pressed to reduce its thickness and expand its circumference.
6. A formed meat product comprising:
   a slice of meat having applied thereto a coating comprising a wash including egg and milk protein and further comprising a covering including wheat gluten; and
   wherein said slice of meat is then reformed by overlapping selected edges of the coated slice of meat and pressing said edges with pressure sufficient to deform said meat, said pressure causing adhesion of said edges by action of the adhesion properties of said coating in response to said deforming pressure to produce a product of flattened shape and of substantially uniform thickness which presents the appearance of a single coated slice of meat, the transition between joined edges becoming substantially un-noticeable.
7. The formed breaded meat product of claim 6 wherein said slice of meat is comprised of a prepared slice of meat having a plurality of deep cuts applied across the surfaces thereof.
8. The formed breaded meat product of claim 7 wherein said slice of meat is comprised of a prepared slice of meat wherein said slice is pressed to reduce its thickness and expand its circumference after having said cuts applied thereto.
9. The formed meat product of claim 8 wherein said coating is pressed into the surface of said slice of meat.
10. The formed breaded meat product of claim 6 wherein said slice of meat is comprised of a prepared slice of meat wherein said slice is first pressed to reduce its thickness and expand its circumference.
11. The formed breaded meat product of claim 6 wherein said coating is prepared with a low fat content milk product.

12. A process of manufacturing a meat product from a slice of meat comprising the steps of:

applying a first coating to said slice of meat, said coating comprising a wash including egg and milk protein and said coating further comprising a covering including wheat gluten; and forming said product by overlapping selected edges of the coated slice of meat and pressing said edges with pressure sufficient to deform said meat, said pressure causing adhesion of said edges by action of the adhesion properties of said coating in response to said deforming pressure to produce a product of flattened shape and of substantially uniform thickness which presents the appearance of a single coated slice of meat wherein the transition between joined edges becomes substantially un-noticeable.

13. The process of manufacturing a breaded meat product from a slice of meat of claim 12 further comprising the step of first preparing said slice of meat by producing a plurality of deep cuts across the surfaces thereof.

14. The process of manufacturing a breaded meat product from a slice of meat of claim 12 further comprising the step of first pressing said slice of meat to reduce its thickness and expand its circumference.

15. The process of manufacturing a breaded meat product from a slice of meat of claim 14 further comprising the step of preparing said slice of meat by producing a plurality of deep cuts across the surface thereof before pressing the slice of meat.

16. The process of manufacturing a breaded meat product from a slice of meat of claim 15 wherein said coating is prepared with a low fat content milk product.

17. The process of manufacturing a breaded meat product from a slice of meat of claim 15 further comprising the final step of:

applying a second coating on the surface of the first coated meat slice, said second coating comprising a wash including egg and milk protein and said coating further comprising a covering including wheat gluten.

18. The process of manufacturing a breaded meat product from a slice of meat of claim 12 wherein said second coating is pressed into the surface of said slice of meat.

19. The process of manufacturing a breaded meat product from a slice of meat of claim 17 wherein said covering of wheat gluten of said first and second coating comprises cracker meal.

20. The process of manufacturing a breaded meat product from a slice of meat of claim 14 wherein said coating is pressed into the surface of said slice of meat.

* * * * *